US008450668B2

(12) United States Patent
Maynard et al.

(10) Patent No.: US 8,450,668 B2
(45) Date of Patent: May 28, 2013

(54) OPTICALLY GUIDED MUNITION CONTROL SYSTEM AND METHOD

(75) Inventors: John A. Maynard, Amherst, NH (US); Mark A. Carlson, Amherst, NH (US); Paul D. Zemany, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 682 days.

(21) Appl. No.: 11/632,671

(22) PCT Filed: Feb. 7, 2006

(86) PCT No.: PCT/US2006/004157
§ 371 (c)(1),
(2), (4) Date: Sep. 25, 2008

(87) PCT Pub. No.: WO2007/089243
PCT Pub. Date: Aug. 9, 2007

(65) Prior Publication Data
US 2009/0039197 A1    Feb. 12, 2009

Related U.S. Application Data

(60) Provisional application No. 60/650,718, filed on Feb. 7, 2005.

(51) Int. Cl.
*F42B 15/01* (2006.01)
*F42B 10/62* (2006.01)
*F42B 15/00* (2006.01)
*F42B 10/00* (2006.01)

(52) U.S. Cl.
USPC .......... 244/3.16; 102/382; 102/384; 102/473; 102/501; 244/3.1; 244/3.15; 244/3.21; 244/3.24

(58) Field of Classification Search
USPC .............. 244/3.1–3.3; 89/1.11; 102/382, 384, 102/501, 473; 342/61–65, 175, 195
See application file for complete search history.

(56) References Cited

U.S. PATENT DOCUMENTS

| | | | | |
|---|---|---|---|---|
| 3,111,088 A | * | 11/1963 | Fisk | 244/3.23 |
| 3,695,555 A | * | 10/1972 | Chadwick | 244/3.14 |
| 3,756,538 A | * | 9/1973 | McLean | 244/3.16 |
| 3,951,358 A | * | 4/1976 | DeLano et al. | 244/3.15 |
| 4,037,806 A | * | 7/1977 | Hirsch et al. | 244/3.16 |
| 4,085,910 A | * | 4/1978 | Baker et al. | 244/3.16 |
| 4,136,343 A | | 1/1979 | Heffner et al. | |
| 4,193,567 A | * | 3/1980 | McCarty, Jr. | 244/3.16 |
| 4,264,907 A | * | 4/1981 | Durand et al. | 342/62 |

(Continued)

*Primary Examiner* — Bernarr Gregory
(74) *Attorney, Agent, or Firm* — Sand & Sebolt; Michael Sand; Daniel J. Long

(57) ABSTRACT

An optically guided munition and control system has a replacement fuse assembly mounted on the front of a munition body or shell casing. An optical seeker subsystem detects an illuminated target and supplies signals to a processor. The processor develops steering commands sent to a flight control subsystem having a plurality of guidance canards which are actuated by drive motors through gear assemblies. The roll of the munition is established and left/right and up/down steering commands are sent to the canard drive motors based upon the optical seeker subsystem detection of the target illuminator. Range adjustment is based upon bore sight lockdown angle and cross range control is based upon left/right centering error. A code is contained in the optical radiation received from the illuminated target which must be validated by a preset code in the system processor to arm the munition.

17 Claims, 9 Drawing Sheets

U.S. PATENT DOCUMENTS

| | | | | |
|---|---|---|---|---|
| 4,347,996 A | * | 9/1982 | Grosso | 244/3.16 |
| 4,383,663 A | | 5/1983 | Nichols | |
| 4,431,147 A | * | 2/1984 | Paley | 244/3.3 |
| 4,438,893 A | * | 3/1984 | Sands et al. | 244/3.21 |
| 4,512,537 A | * | 4/1985 | Sebestyen et al. | 244/3.21 |
| 4,522,356 A | | 6/1985 | Lair et al. | |
| 4,561,611 A | * | 12/1985 | Sinclair et al. | 244/3.16 |
| 4,568,039 A | * | 2/1986 | Smith et al. | 244/3.15 |
| 4,606,514 A | | 8/1986 | Sundermeyer | |
| 4,624,424 A | * | 11/1986 | Pinson | 244/3.21 |
| 4,676,456 A | * | 6/1987 | Grosso et al. | 244/3.21 |
| 4,679,748 A | * | 7/1987 | Blomqvist et al. | 244/3.19 |
| 4,690,351 A | * | 9/1987 | Beckerleg et al. | 244/3.16 |
| 4,699,333 A | * | 10/1987 | Pinson | 244/3.21 |
| 4,711,412 A | | 12/1987 | Wallermann | |
| 4,856,733 A | | 8/1989 | Lachmann | |
| 4,883,239 A | | 11/1989 | Lachmann et al. | |
| 5,035,376 A | * | 7/1991 | Voigt et al. | 244/3.21 |
| 5,088,659 A | * | 2/1992 | Neff et al. | 244/3.16 |
| 5,260,709 A | | 11/1993 | Nowakowski | |
| 5,374,009 A | * | 12/1994 | Miller et al. | 244/3.13 |
| 5,467,940 A | | 11/1995 | Steuer | |
| 5,478,028 A | | 12/1995 | Snyder | |
| 5,529,262 A | * | 6/1996 | Horwath | 244/3.16 |
| 5,631,654 A | | 5/1997 | Karr | |
| 5,647,558 A | | 7/1997 | Linick | |
| 5,669,581 A | * | 9/1997 | Ringer | 244/3.16 |
| 6,138,944 A | * | 10/2000 | McCowan et al. | 244/3.13 |
| 6,244,536 B1 | | 6/2001 | Cloutier | |
| 6,467,721 B1 | | 10/2002 | Kautzsch et al. | |
| 6,621,059 B1 | | 9/2003 | Harris et al. | |
| 6,817,569 B1 | * | 11/2004 | Horwath | 244/3.17 |

* cited by examiner

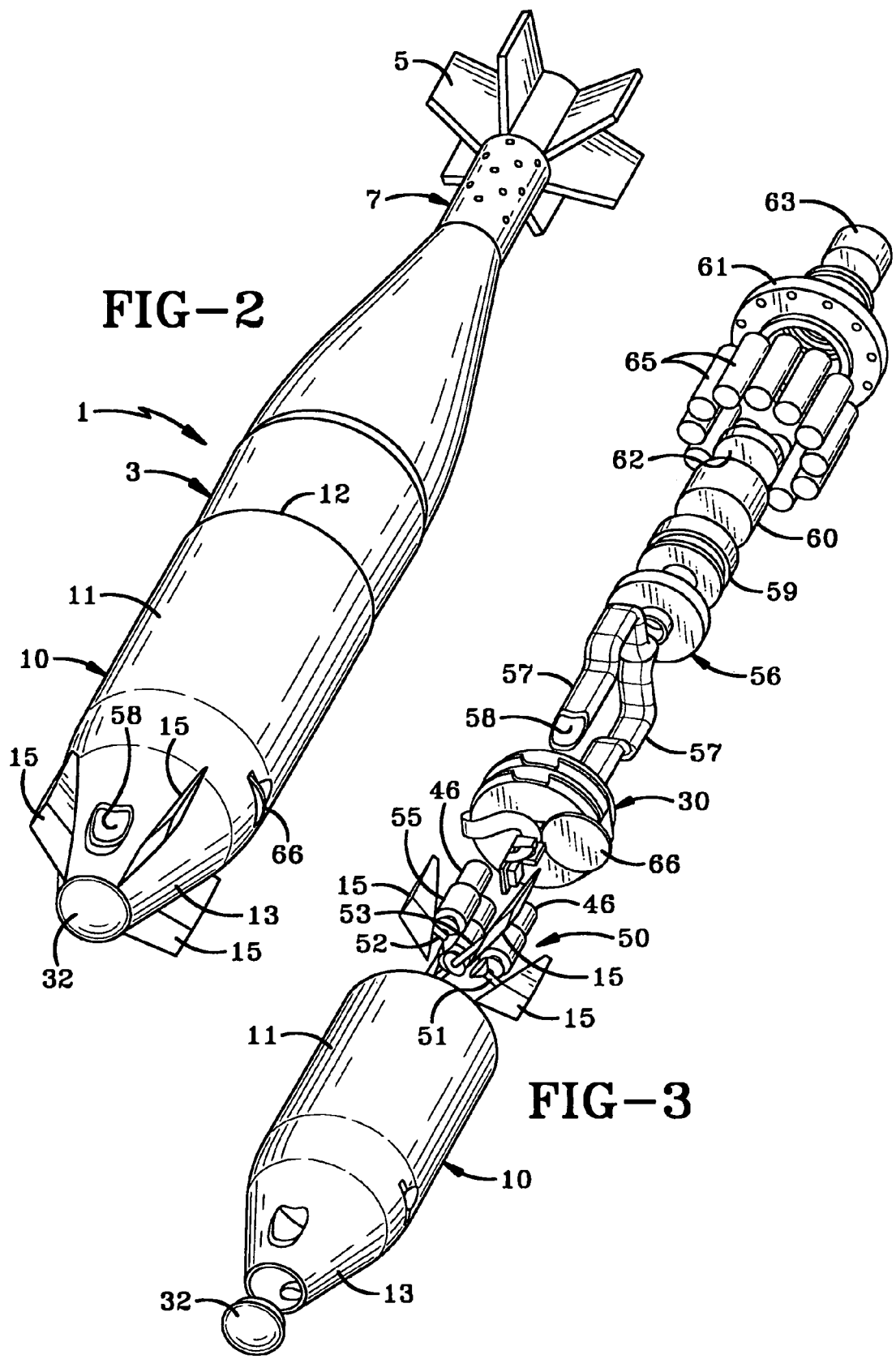

OPTICALLY GUIDED MUNITION CONTROL SYSTEM AND METHOD

CROSS REFERENCE TO RELATED APPLICATION

This application claims rights under 35 USC 119(e) from U.S. application Ser. No. 60/650,718, filed Feb. 7, 2005; the contents of which are incorporated herein by reference.

BACKGROUND OF THE INVENTION

1. Field of the Invention

The present invention relates to armaments and more particularly to guided munitions. More particularly, the invention relates to a system and method for optically guiding a munition following a ballistic path toward a target by processing optical signals from an optical source located at the target and controlling the roll of the munition to generate flight control signals fed to a plurality of flight control canards mounted on the munition.

2. Background Information

Mortars are one of the most commonly employed weapons in a ground combat unit. The traditional role of mortars has been to provide close and continuous fire support for maneuvering forces. Military history has repeatedly demonstrated the effectiveness of mortars. Their rapid, high-angle, plunging fires are invaluable against dug-in enemy troops and targets in defilade, which are not vulnerable to attack by direct fires. One of the major disadvantages of mortars is their comparatively low accuracy, and as a result mortars are becoming less effective in today's precision combat environment. Equipping a mortar round with a precision guidance package will increase its accuracy, enabling the mortar to be a precision munition that will be significantly more effective in wartime situations. For maximum utility, the guidance package preferably should be an inexpensive retrofit to current munitions, with a cost in production that allows its use in all situations, either as a guided or unguided weapon.

Unguided munitions are subject to aim error and wind disturbances. These often cause the munition to miss the target completely or require many rounds to complete the fire mission due to the large CEP (Circular Error Probability). Current approaches to guided weapons are expensive and are used on larger long range weapons. The approach of the present invention results in significantly lower cost and smaller size. This allows use with small to medium caliber weapons and significantly improves CEP which also results in a significant reduction in the quantity of rounds required to complete the fire mission which in turn results in lower overall cost and improved crew survivability. In addition, another benefit to this approach is the virtual elimination of collateral damage due to errant rounds impacting non-targeted areas.

Mortars, if guided at all, are guided by an expensive guidance and control (G&C) system. The cost is high for current guided mortars and unguided mortars have poor accuracy. Also, unguided mortars result in unacceptable collateral damage, excess cost due to large number of rounds required to blanket target area, and expose the mortar crew to counter-battery fire due to large time required to drop the necessary shells to saturate the target.

Existing prior art guidance systems and methods use algorithms that may be computationally inefficient, require excessive input information, are incompatible with new sensor designs and require expensive support hardware (seeker implementation).

Therefore, there is a need for an accurate and cost effective method for optically guiding munitions such as mortars. There is also a need for an ultra low cost G&C approach for mortars which is compatible with a large class of rounds. Furthermore, there is a need for a highly efficient detection/tracking algorithm compatible with optical hardware and limited processing capability associated with small caliber precision guided weapons design.

BRIEF SUMMARY OF THE INVENTION

The present invention provides a computationally efficient method, algorithm, and implementation which is compatible with low cost optical seeker components and a low volume stability augmentation system to provide the necessary detection and processing capability to control a small caliber round thereby providing a cost effective guided munition. The technique of the present invention also is compatible with other munitions and applications, and is simple and robust with intrinsically low false alarm rate.

The present invention furthermore provides an algorithm for interface with an (IR) infrared (optic) seeker design which results in significant improvement in CEP and cost reduction.

Furthermore, the present invention provides a control and guidance system for a munition which mounts an optical seeker subsystem in the nose of the munition, which includes an optical array of photodetectors. The photodetectors receive tracking signals from an illuminator at a target, which signals are supplied to a processor subsystem, which in turn, provides steering signals to a plurality of canards. The canards provide up and down steering directions to correct for range errors of the munition and left/right steering directions to correct for lateral aiming areas. The canards change the ballistic path of the munition as it approaches the target to provide a more accurate circular error probability at the target.

Another aspect of the present invention is to provide the munition with an authentication code which must validate a code contained in the radiated signal from the illuminated target in order to arm the munition to ensure that the correct munition is being directed to a particular target.

A still further feature of the present invention is to provide the munition with a Ram Air Turbine which supplies a processor subsystem in the munition fuse with the flight time of the munition to apogee, which time is used to estimate the trajectory of the munition. The estimated trajectory is matched against allowed trajectories stored in the processor in order to determine the true angle of attack of the munition and provide up and down steering corrections to certain canards mounted on the nose of the munition for correcting any range error.

A further aspect of the invention is to provide a canard drive assembly with a three axis control mechanism, preferably comprised of four canards, two of which are controlled by a common shaft with the remaining two canards each being controlled by an independently driven shaft; and wherein the shafts are driven through a gear reduction mechanism to provide the desired transmission of power from the drive motors to the canards.

Still another feature of the present invention is to form the guidance and control system and the various subsystems thereof on printed circuit boards which are mounted in a compact condition in the replacement fuse of the munition, which enables the guidance and control system to withstand the various G forces exerted thereon during launch and ballistic flight toward the target.

A further aspect of the present invention is to enable the replacement fuse to be located within a nose housing attached to the usual body of the munition thereby avoiding any redesign or manner of use of the munition, enabling it to be launched by existing mortar launchers or other type of propelling mechanism.

Still another aspect of the present invention is to provide the control and guidance system with three MEMS gyros to sense the body yaw, pitch and roll. The gyros provide signals through a processor subsystem to a flight control subsystem to initially deroll the munition, afterwhich the range and aiming errors can be more easily corrected based upon the radiated signals from the illuminated target detected by the detector array of the optical seeker subsystem.

BRIEF DESCRIPTION OF THE SEVERAL VIEWS OF THE DRAWINGS

The present invention is further described with reference to the accompanying drawings wherein:

FIG. 2 is a perspective view of a preferred embodiment of the optically guided munition having the improved control system incorporated therein.

FIG. 3 is an exploded perspective view of the fuse mechanism of the munition of FIG. 2 containing the control system of the present invention.

Similar numbers refer to similar parts throughout the drawings.

DETAILED DESCRIPTION OF THE INVENTION

Figure 1:
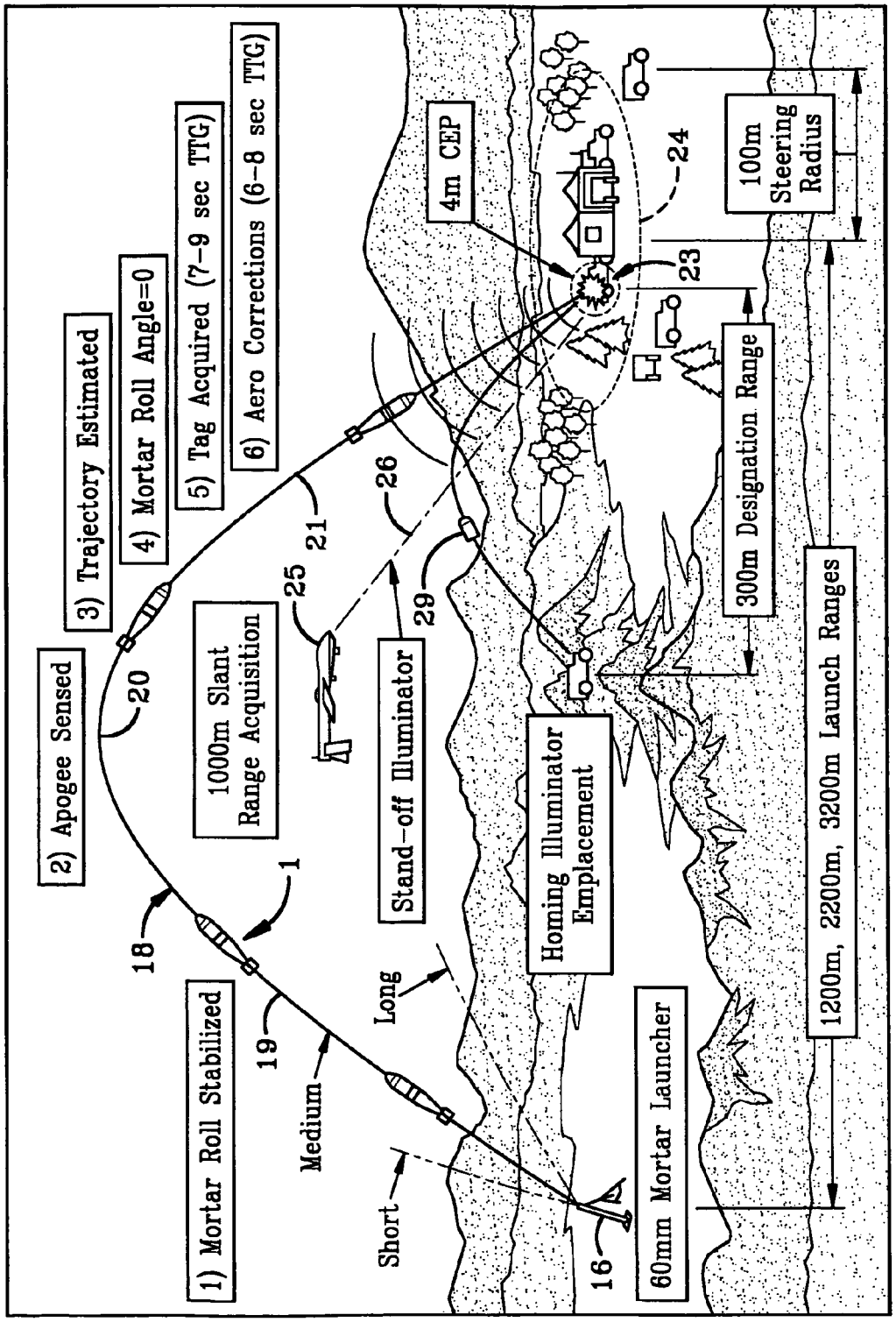
FIG. 1 is a diagrammatic view showing the operation of a preferred embodiment of the optically guided munition control system of the present invention.

A preferred embodiment of the control system and method of the present invention for optically guiding a munition toward a target is shown diagrammatically in FIG. 1. The optically guided munition is indicated generally at 1, and preferably is a mortar, such as a 60 mm mortar. An example of such a mortar shell or round is shown in FIGS. 2 and 3. Mortar 1 includes a main body 3 formed with a hollow interior in which is contained an explosive charge. At the rear of body 3 will be usual aerodynamic stabilizing fin 5 with a propellant charge being located within an adjacent housing 7. In accordance with one of the features of the invention, a replacement fuse indicated generally at 10 is mounted on the front or fore portion of body 3, preferably by a threaded connection at 12. Fuse 10 includes a housing 11 having a tapered front portion 13 on which is mounted a plurality of guidance canards 15. Fuse 10 replaces a standard nose/fuse construction used with body 3, and thus enables the control and guidance system to be incorporated into currently used munitions without requiring major modifications thereto. The term "canards" as used throughout also includes mid-body mounted wings or other aerodynamic control surfaces which can be used in the concept of the present invention.

Munition 1 is discharged from a usual mortar launcher 16 which propels the munition into a normal ballistic path 18 which is determined by the angle of elevation of the mortar launcher, the weight of the munition, the size of the explosive propelling charge, atmospheric conditions such as wind temperature etc. Munition 1 follows an upward path 19 until it reaches apogee 20 where it starts its downward descent along a projected path 21 with the anticipation that it will hit a target 23 within an acceptable CEP indicated by dashed lines 24. In one embodiment, the target is illuminated by means of a standoff illuminator 25 which projects a beam 26 onto target 23. Beam 26 can be a laser or other type of optical detectable beam. The optical illuminator at target 23 can also be an optical tag 29, which is placed at the target by various means such as being propelled to the target from a grenade launcher or secretly placed at the target prior to the launch of munition 1. The main feature of the illuminator regardless of its particular type and method of arriving at the target site is that it will radiate an optical recognized signal to direct munition 1 to the target. The target illuminator preferably will operate at a frequency not visible by the human eye, such as infrared (IR), preventing it from being exposed to an enemy at the target site. Furthermore, the illuminator may operate at a coded frequency which must be validated by munition 1 in order to arm the munition for explosion upon reaching the target.

Figure 4:
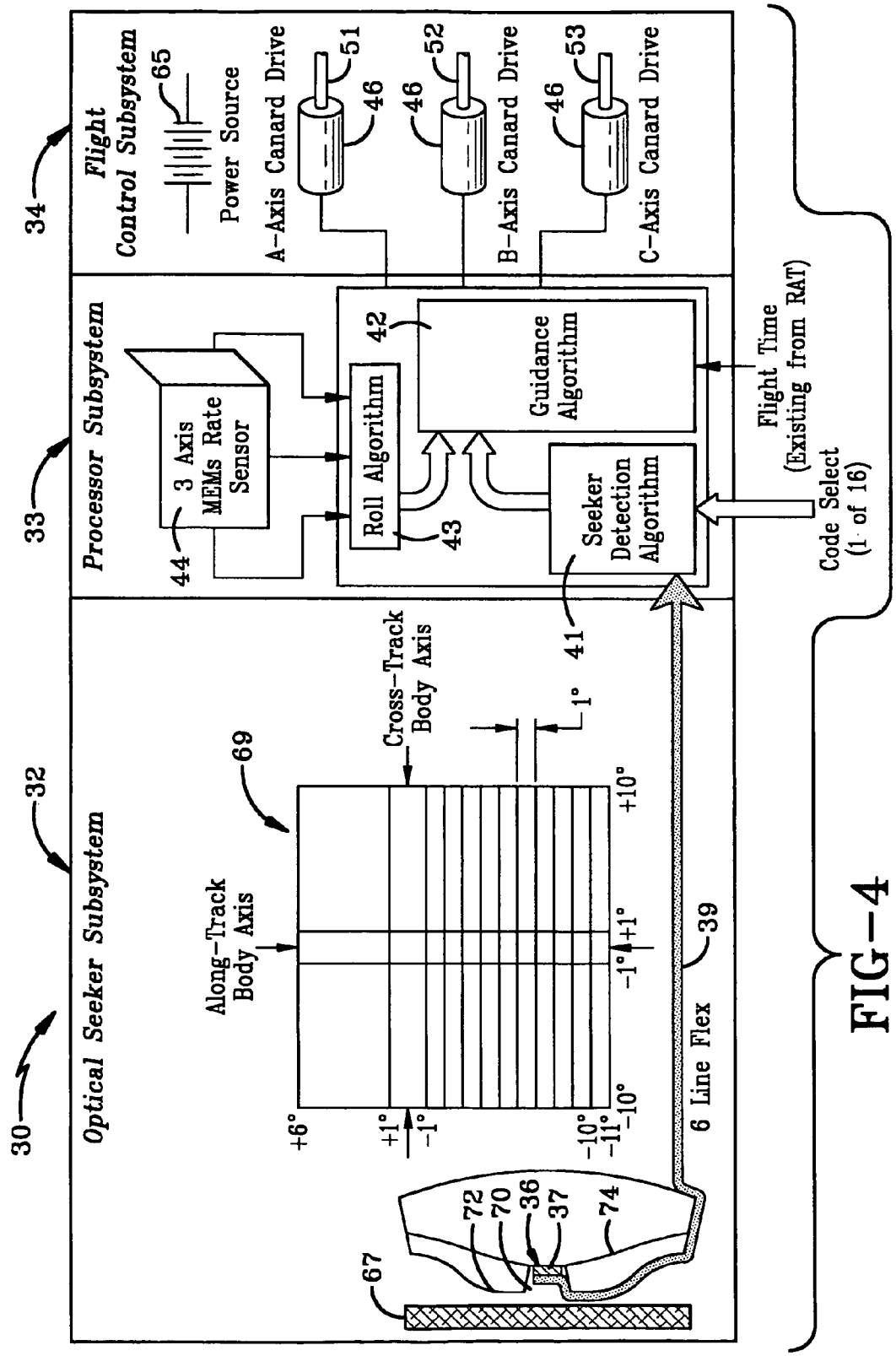
FIG. 4 is a schematic diagram of the guidance and control system of the present invention.
Figure 5:
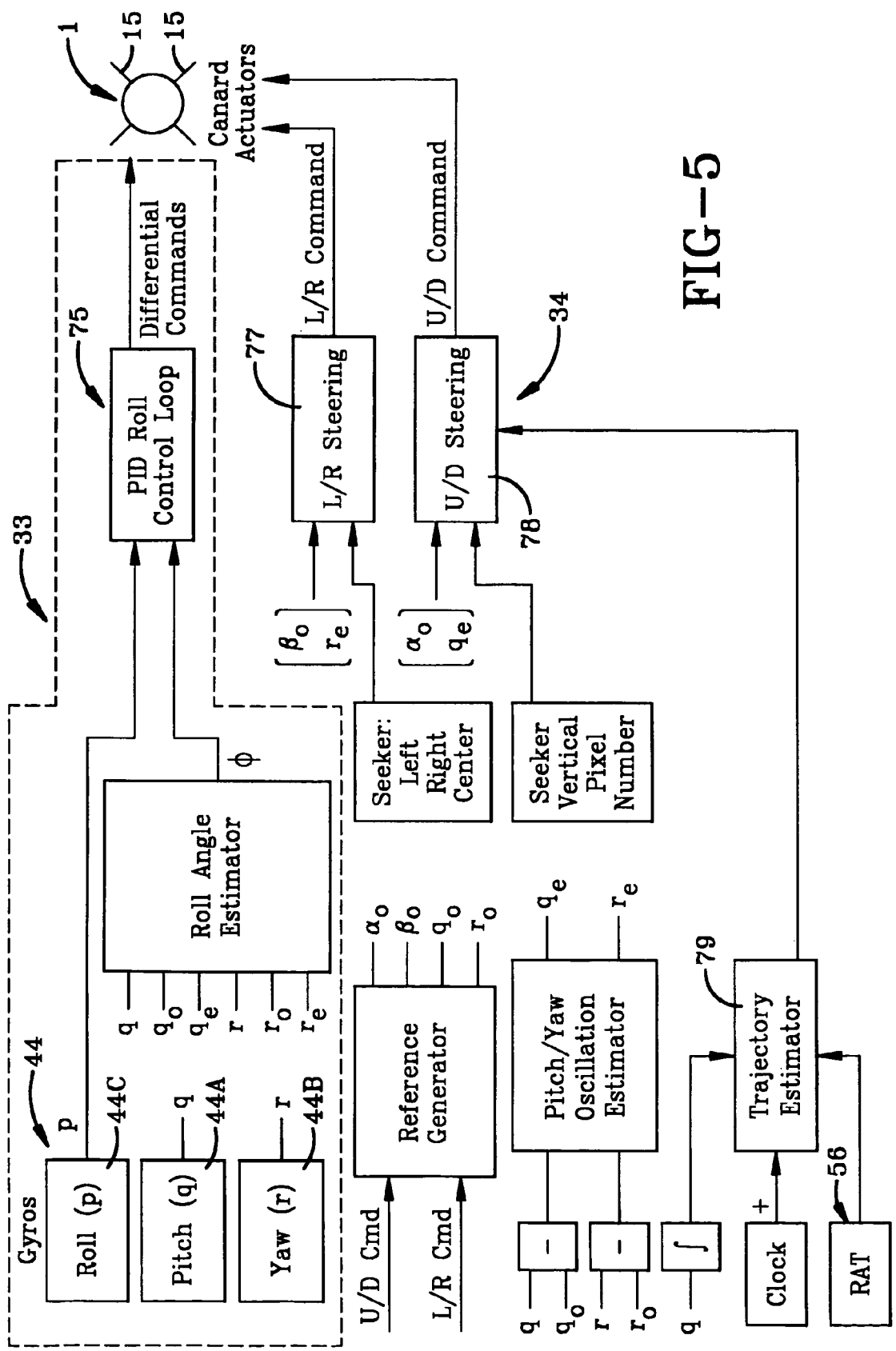
FIG. 5 is a block diagram showing further details of the guidance and control system of the present invention shown in FIG. 4.

The optical guidance and control system (G&C) of the present invention is indicated generally at 30, and is shown particularly in schematic block diagram form in FIGS. 4 and 5. The G&C system 30 includes an optical seeker subsystem 32, a processor subsystem 33 and a flight control subsystem 34. Optical seeker subsystem 32 shown in further detail in FIGS. 4-7, includes seeker optics 36 and a detector array 37. Optical seeker subsystem 32, is tied into processor subsystem 33 as shown by Arrow 39 (FIG. 4) and provides the input data to a seeker detector algorithm 41 which communicates with a guidance algorithm 42. A roll algorithm 43 which also operationally communicates with guidance algorithm 42, is supplied with signals from three rate gyros 44, and provides signals to guidance algorithm 42, which in turn supplies flight control signals to flight control subsystem 34.

Figure 10:
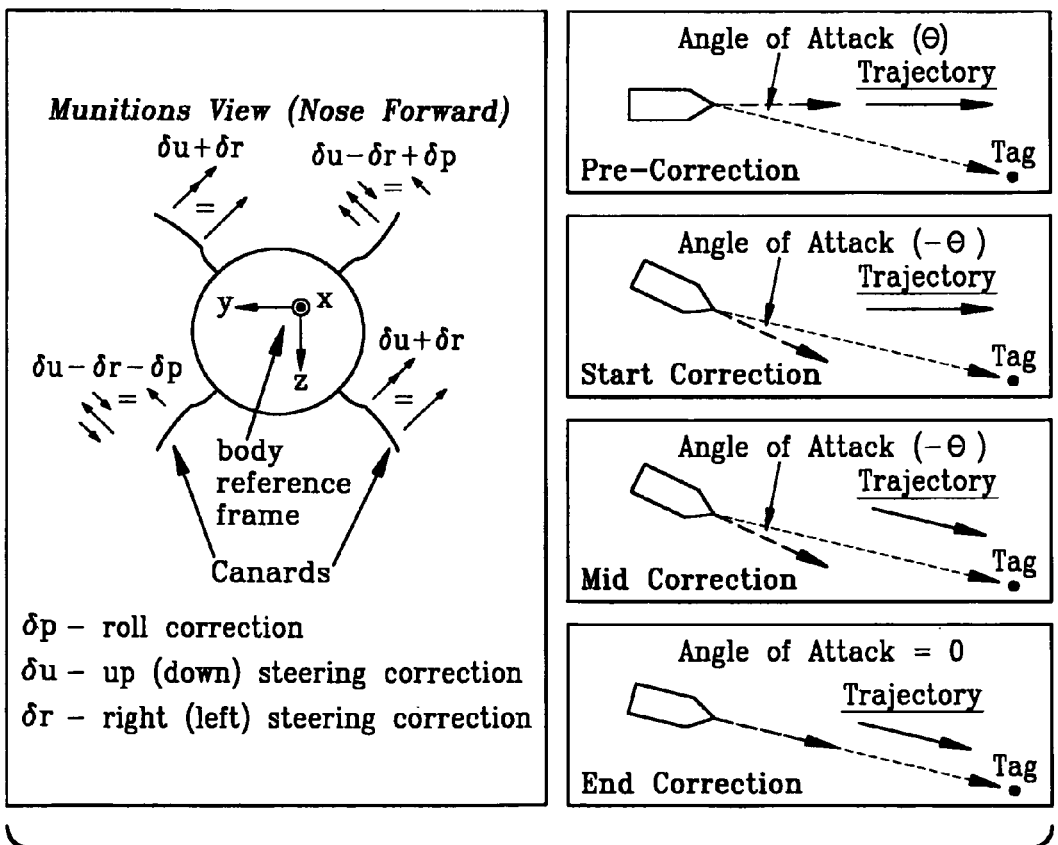
FIG. 10 is a schematic block diagram showing the seeker steering control.

Steering commands are supplied by processor subsystem 33 and then to flight control subsystem 34, and in particular to a plurality of canard drive motors 46 which are connected to a plurality of canard drive shafts for rotating the canards to control the flight of munition 1. Drive motors 46 are part of a guidance control mechanism indicated generally at 50, which consists broadly of the four canards 15, two of which are mounted each on independent shafts 51 and 52 for controlling the roll, pitch and yaw of the munition, with the remaining pair of canards 15 being mounted on a single common shaft 53 which is used to control the pitch and yaw of the munition, as shown in FIG. 10. The shafts are controlled by the three drive motors 46, which preferably are high torque two phase stepper motors operatively connected to the canard shafts by gear assemblies 55. Further details of a preferred embodiment of the three axis control mechanism 50 is shown and described in U.S. patent application Ser. No. 11/629,921, filed Dec. 18, 2006, entitled, Three Axis Aerodynamic Control Of Guided Munitions, the contents of which are incorporated herein by reference.

Also located in fuse housing 10 (FIGS. 2 and 3) will be a Ram Air Turbine (RAT) 56 including air ducts 57 which supply air through end openings 58 located in tapered portion 13 of housing 11 for controlling an alternator and switch plate assembly 59, a safe/arm rotor assembly 60, and a rotatably mounted barrier plate 62, preferably of a type currently used in existing mortar fuses. An end cap or plate 61 secures the various components in fuse housing 11. A booster pellet 63 is located adjacent end plate 61 within the end of fuse housing 11. An array of batteries 65 is mounted forwardly of end plate 61 for supplying the required power for the canard drive motors and for the processor subsystem and optical seeker subsystem. A manually actuated thumb wheel switch 66 preferably is located in the tapered portion of fuse housing 11 for setting a code of the day (COD) into the processor subsystem 33 which can be programmed in the processor to require a match against a code transmitted by the target illuminator to arm the munition. Further details of the munition per se, are shown and described in U.S. patent application Ser. No. 11/629,062, filed Dec. 8, 2006, now U.S. Pat. No. 7,533,849, entitled, Optically Guided Munition, the contents of which are incorporated herein by reference.

In addition to inputs from optical seeker subsystem 32, processor subsystem 33 can receive inputs from the RAT as to the time of flight and apogee determination, a G-switch launcher detector for accurate launch determination, and the input from thumb wheel switch 66 for authentication code selection. An integral switch (not shown) with a disposable filter 67 for selection of laser designator versus illuminator can also be provided in optical seeker subsystem 32. Filter 67 is removed when the munition is used in the nighttime. Apogee detection can also be supplied to the processor subsystem through external data other than the RAT of the fuse, thereby eliminating any specific hardware dependency. Fuse 10 will also contain the usual fuse components with booster pellet 63 to cause detonation upon contact, or at a certain elevation above the target, or with a time delay, or other type fuse settings well known in the fuse art. Fuse 10 preferably is mounted by the threaded connection 12 onto shell body 3 replacing the heretofore threadedly attached standard fuse without the guidance and control system incorporated therein. This results in a slightly longer munition, but one having the same diameter as the previously replaced fuse enabling it to be launched easily from a usual mortar launcher 16 as shown in FIG. 1.

Guidance and Control Inputs to Detection Processing and Tracking

The approach taken for guidance of munition 1 is to combine both "brute force" navigation to the target where the mortar flies a straight line to the target and "ballistic correction" which requires small steering corrections. Key to the navigation approach is target detection and tracking. At the start of control, discrete optical sensor output provided to processor subsystem 33 is used to estimate "down" and adjust the nominal ballistic trajectory based upon detection of the target through processing of the optical seeker quantized data. Range adjustment is based on the bore sight look down angle temporal history, and cross range control is based on the left/right centering error, data for which is an output of the optical seeker subassembly. As the flight progresses, the bore sight look down angle approaches zero (FIG. 10). When the lookdown angle is small, then the direct homing approach is used. This approach is selected because it takes advantage of the features of both approaches. The detection processing algorithm 41, through analysis of the optical seeker output, controls the actual technique selection which is then acted upon through the guidance and control algorithm. Further details of one type of control algorithm which can be used is described in further detail in U.S. patent application Ser. No. 11/629,060, filed Dec. 8, 2006, entitled, Ballistic Guidance Control For Munitions, the contents of which are incorporated herein by reference.

The "ballistic correction" approach does not require a high g vertical steering offset. In contrast, the "brute force" approach needs a large command in the early portion of the controlled flight. This favors using a "ballistic correction" at the start of the flight. This approach also eases demands on the detection processing and tracking algorithm.

During the final portion of the controlled flight, the required steering offset is smaller and a "brute force" approach can be used. The advantage of the "brute force" approach is that it is insensitive to trajectory estimation error or down estimation, both factors ease the burden on the detection processing and tracking algorithms providing an intrinsic robustness.

The approach to aerodynamic control is to stabilize, preferably deroll the roll vector of the mortar round. As manufactured, a typical 60 mm round is free to roll. Since the existence of body roll is indeterminate initially upon launch tube exit, the roll vector itself cannot be relied on to provide any method of control. Any optical sensor would either have to be derolled or have an excessively large field of regard (FOR) to be able to acquire and track the target at the extreme acquisition ranges in any arbitrary attitude. Additionally, the processing to determine the "down" vector is greatly simplified with a stabilized roll component.

The approach of the present invention for guiding the munition toward a target is shown diagrammatically in FIG. 10, and derives the absolute maximum normal force in the direction of the target as quickly as practical by deliberately controlling, then rolling the mortar airframe first into an X orientation relative to the target, then deflecting all four canards to develop the normal acceleration in the direction of the target. This method brings to bear all four canard surfaces in terms of maneuver force. It also positions the optical seeker field of view (FOV) in an optimal location to facilitate target tracking and output to the detection processor and integration of the guidance algorithm.

Figure 6:
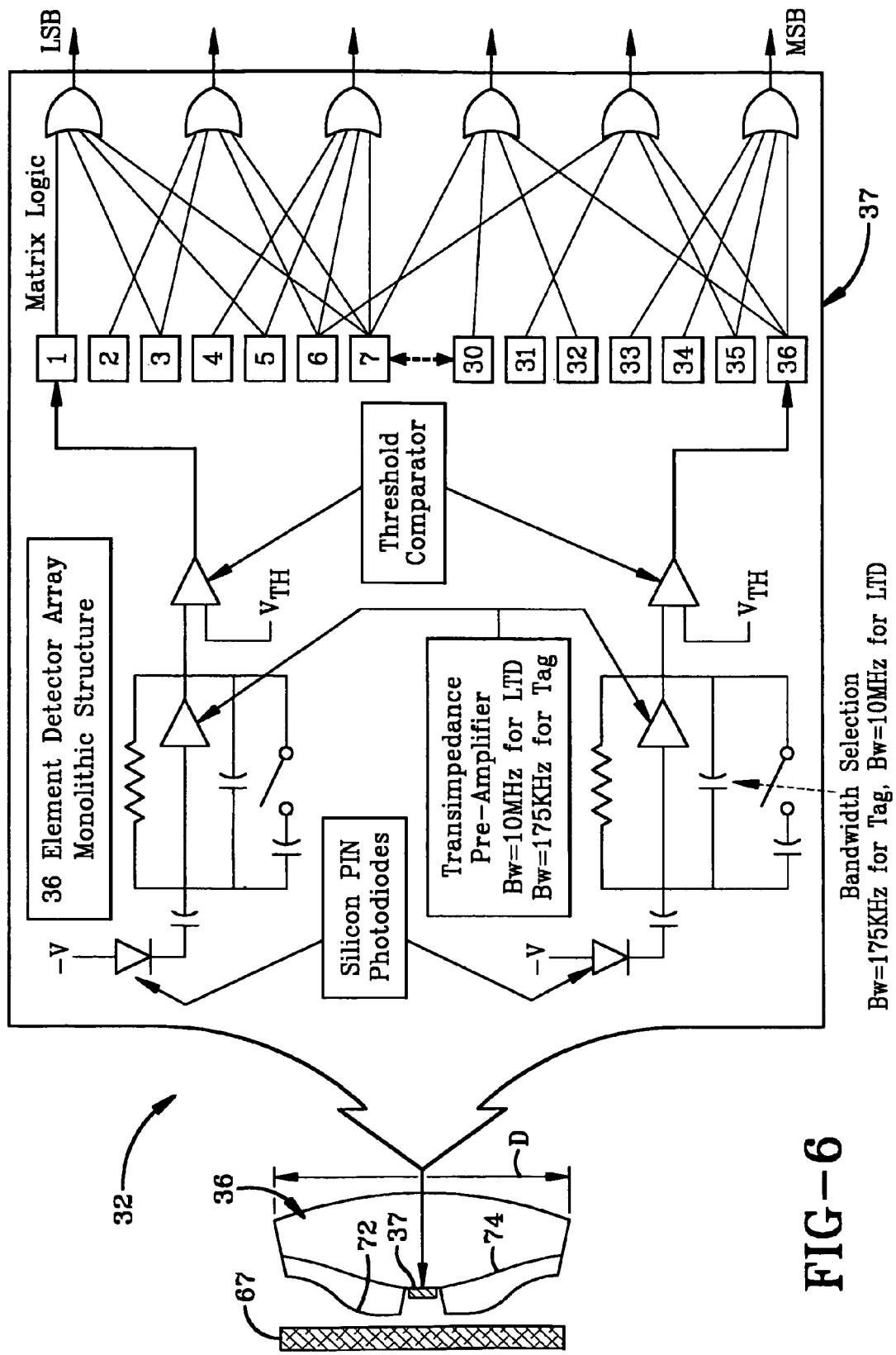
FIG. 6 is a schematic diagram of a preferred embodiment of the optical seeker subassembly of the present invention.
Figure 7:
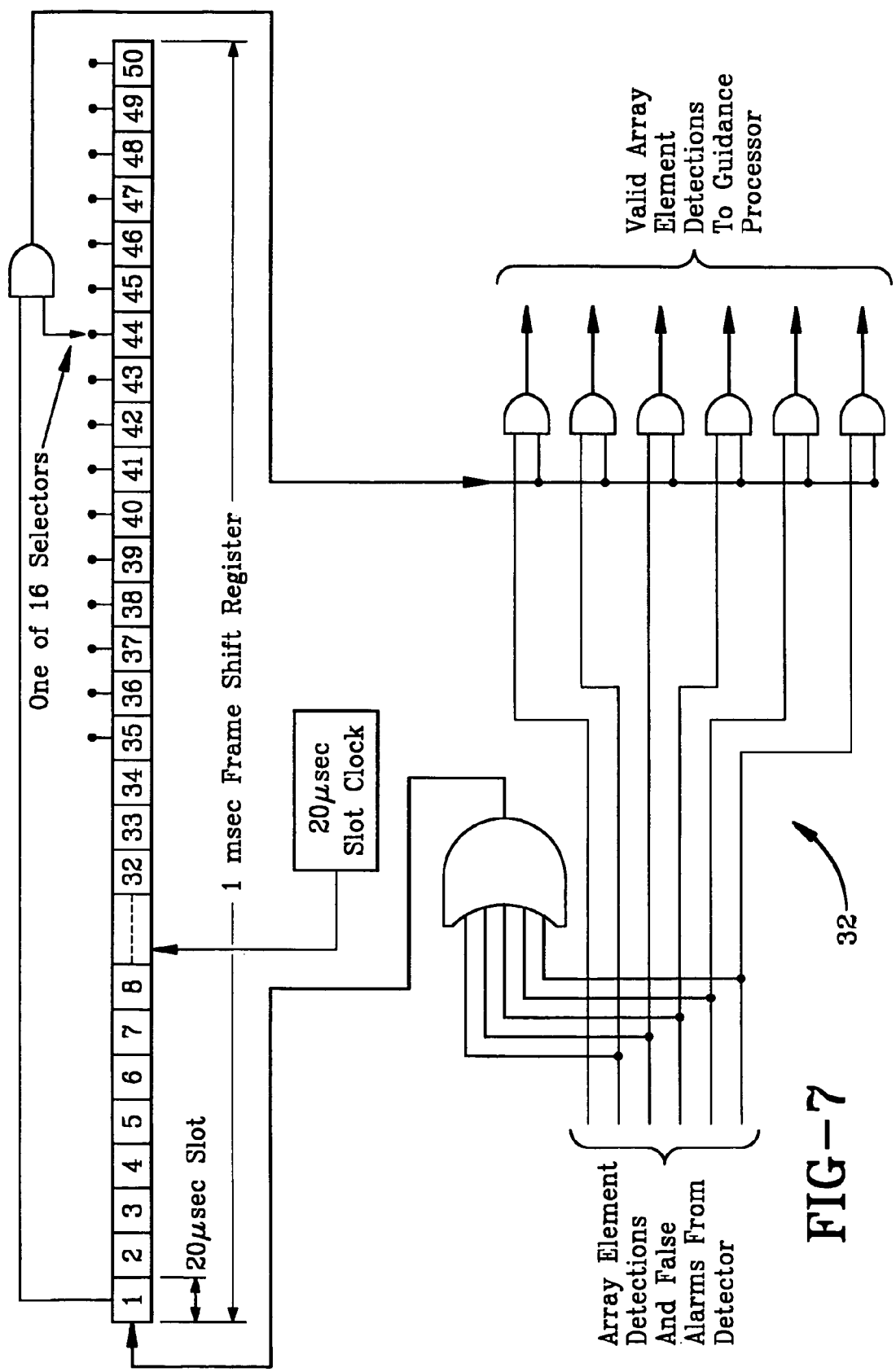
FIG. 7 is a schematic drawing showing the signal processing components for multiple homing illuminator discrimination with signal to noise ratio (SNR) reduction in a preferred embodiment of the present invention.

The functional diagram of the optical seeker subsystem 32 is shown in FIG. 6. As shown, the optical seeker subassembly is broken into two components, seeker optics 36 and detector array 37. Because of the extremely close coupling between the optics and the array, these two components preferably are assembled as an integrated optical seeker subsystem 32. An initial set of key performance parameters for the optical seeker subsystem are shown in FIGS. 6 and 7. These are ultimately tied back to the detection processing and tracking algorithm as input data. Specifically, the field of view (FOV) format is key to proper target recognition, tracking, and the steering commands generated as a result of the work performed in the detection and tracking algorithm.

In the preferred embodiment, the seeker optics 36 has a 20-mm entrance-aperture diameter (D, FIG. 6), with a field of regard (FOR) of +10° cross-track and +6° to −11° along-track as shown by body axis graph 69 in FIG. 4. The physical size of the detector array 37 is approximately 2×2 mm. From these requirements it has been determined that the system's f-number must be on the order of 0.24. It is not theoretically possible to achieve this low f-number using a purely refractive system, due to the high curvatures required.

Since the detector array is centered on the optical axis, the entire optical system will be canted down 6° relative to the body axis, in order to provide the required FOR of −11° to +6° in the along-track direction. A central hole 70 in lens element 72 provides the necessary clearance for detector array 37 to be bonded to a central flat area on lens element 74. Array 37 is a non-imaging optic detector array mounted as a central obscuration on lens element 74.

Detection processing and tracking is intimately tied to optical seeker output performance. The tracking is established when a target, in particular an illuminating tag, appears as a pixel in a portion of the optical array. Position is determined and steering commands generated in order to null the error in both the cross track and along track axis.

Control Processor System

The control processor subsystem 33 performs three primary functions in the improved, replaceable fuse assembly: detection processing of the optical seeker output to validate the correct one of a plurality of authentication codes from the illuminator and provide validated seeker outputs for navigation; secondly, establish roll control of the mortar round based on included inertial sensors (gyros), preferably negating any roll of the munition; and thirdly, provide steering commands to the flight control subsystem canards 15 based on roll control and optical seeker outputs. In addition to inputs from the optical seeker, the control processor subsystem 33 receives inputs from the Ram Air Turbine (RAT) 56 of the fuse. Typically, other fuse components can be incorporated for time of flight and apogee determination, a g-switch launch detector for accurate launch determination, and the body mounted thumbwheel switch 66 for authentication code selection, and finally, an integral switch with the disposable filter 67 for selection of laser designator versus illuminator. Apogee detect can also be supplied through external data other than the RAT of the fuse thereby eliminating any specific hardware dependencies.

Seeker Detection Processing

A number of different approaches can be utilized for efficient application of signal processing to further optimize the receiver performance. To minimize cost, signal processing is combined with the requirement for temporal discrimination for multiple homing illuminators. The approach selected is a two pulse coincidence gate where the coincidence time was selective for 1 of 16 different windows (FIGS. 6 and 7). The physical selection is with a rotary switch located on the external periphery of the fuse shell.

Figure 8:
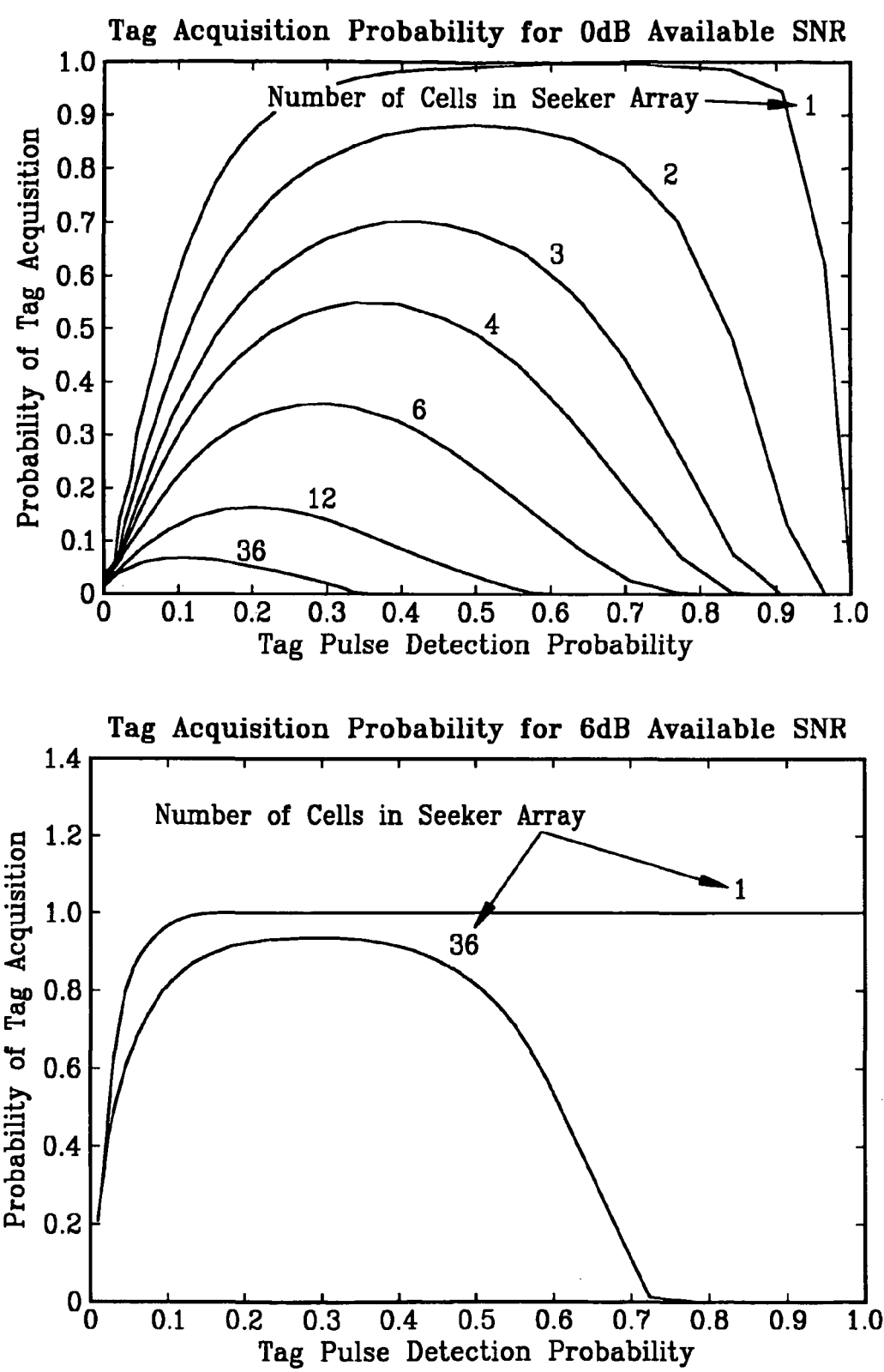
FIG. 8 are graphs showing how optical designator detection meets required detection probability with >6 dB SNR, in a preferred embodiment of the present invention.

Simulations of signal acquisition with a signal to noise ratio (SNR) consistent with a 0.1/sec false alarm rate and adequate detection probability (>6 dB) have demonstrated that a signal can be reliably acquired within 64 msec (FIG. 8). This is more than adequate to meet the guidance requirements for all shots. When operating with legacy laser target designators, coincidence gating is bypassed since no unique codes are required for this operation. If desired, processing could be modified to include current MIL-STD EOCCM codes.

Roll Control

Figure 9:
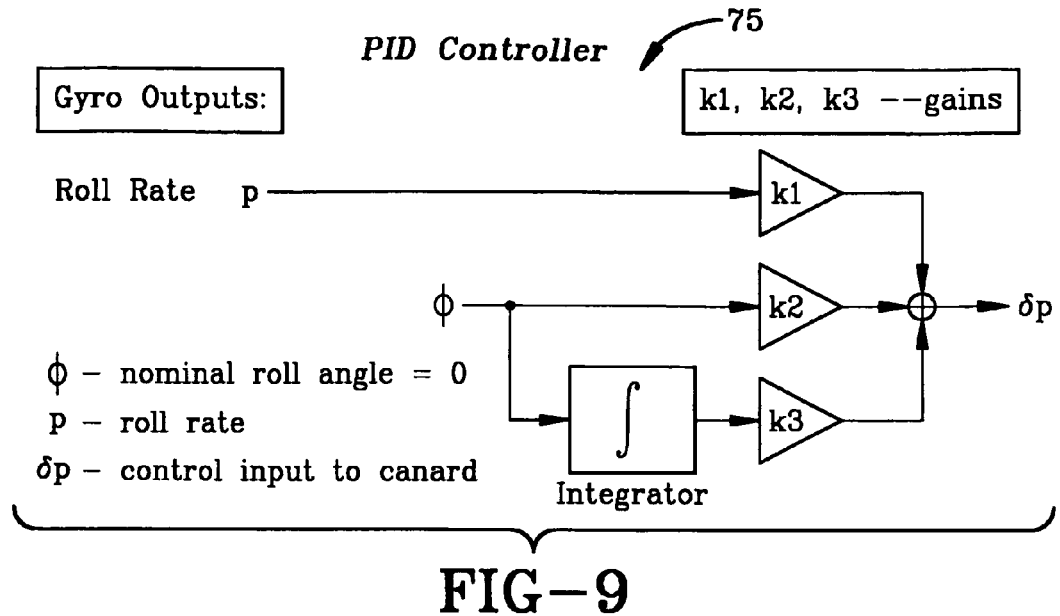
FIG. 9 is a schematic block diagram of a preferred embodiment of the Proportional-Integral-Derivative controller (PID) of the present invention.

Zero roll is maintained by using a Proportional-Integral-Derivative (PID) control loop indicated generally at 75, (FIG. 9). The "proportional" and "integral" inputs come from the pitch and yaw rate gyros, indicated at 44A and 44B, respectively. The "derivative" input comes from the roll rate gyro 44C (FIG. 5). These three inputs are combined to estimate the instantaneous roll rate component and steer the canards appropriately to offset this roll effect as shown in FIG. 10, that is, deroll munition 1.

Steering Control

Steering control has two separate components: YAW (left/right) control, in which the canards, acting in pairs, provide horizontal displacement, and Elevation (up/down) in which the canards, again operating in pairs, provide an increment or decrement to the projectile range. Two of the diagonally opposed canards also provide the roll control discussed above. FIG. 10 demonstrates this effect.

Input to the flight or steering control subsystem comes from the seeker detection processor, which provides information regarding the mostly likely pixel array element at rates between 10 Hz (laser designators) and 1 KHz (seeker illuminator). The steering control processor estimates the bore sight offset location at >10 Hz rate. This allows the steering control processor to provide a finer estimate than the seeker processor provides.

Left/Right Steering Correction

The horizontal steering correction term is determined from the left/right centering error determined from the detector array 37. This error is used to determine the necessary correction to drive the canards to correct any lateral aiming error by use of a L/R steering loop 77 (FIG. 5). The flight control subsystem also monitors the bore sight angle and accounts for any angle of attack (AOA) developed because of the steering command and repositions the canards accordingly. An outline of this process is shown in FIG. 10. In the actual flight control processor, the canard positions will be continually updating, therefore the angle of attack will be constantly adjusted. Thus, the instantaneous illumination of the homing illuminator will slowly oscillate back and forth across the centerline of the detector array.

Up/Down Steering Correction

Vertical steering correction is done in a similar manner to the horizontal steering correction. However, unlike the left/right correction where the desired horizontal angle of attack is known and equals zero (at the detector array centerline), the up/down correction requires a vertical angle of attack which is dependent on the mortar trajectory and time to impact. By using the RAT developed time-to-apogee, an estimate of the mortar trajectory and remaining time of flight can be determined. This is achieved by a trajectory estimator circuit 79 (FIG. 5). A table in the processor subsystem will store the allowable mortar trajectories and will fit the best match to the true trajectory. Using this desired trajectory the desired-vertical angle of attack can be determined at each 10 Hz update point. The true vertical angle of attack can then be compared to this desired angle of attack and the necessary correction can be made. The up/down steering correction is made by a U/D steering loop 78 and is combined appropriately with the roll correction to deflect the canards as appropriate.

As shown in FIG. 10, a two axis configuration with 3 degrees of freedom (DOF) is preferred which will provide (1) roll stabilization by a differential canard deflection, (2) left/right steering, and (3) up/down steering. In this 3-DOF controller approach, a vertical reference is estimated and the projectile is rolled to a fixed roll angle. With a fixed roll angle, it is then possible to command up/down and/or left/right turns to adjust the trajectory.

The trajectory correction approach involves estimation of the trajectory and a determination of the impact point relative to the target. If the mortar is on course, the target will be centered with respect to the left/right center line represented by the body axis graph 69 (FIG. 4). It will also be aimed at the proper elevation angle vs. time. Thus, the downward look angle will follow a specific time history. For a cross track error the location of the target with respect to the left/right of the bore sight center line is the "horizontal" error signal. This error is used to deflect the canards to correct the cross track error. In this case a trajectory estimate is not needed, and only an estimate of down is required to roll the mortar to zero degree roll angle.

To correct along-track errors, the "vertical" error signal is computed from the difference between the nominal bore sight look down angle and the bore sight look down angle measured by the seeker. To implement this approach, the trajectory is estimated by trajectory estimator circuit 69 (using time to apogee and launch speed). This trajectory estimate is then used to provide the nominal look down angle to the impact point. This nominal angle is time dependent and decreases a few degrees per second. This nominal value is compared to the seeker value. If the nominal value exceeds the seeker value then the current trajectory will pass over the target. In this case a downward correction is applied. If the nominal value is less than the measured value, an upward correction is applied.

In the absence of gravity, the nominal bore sight look down angle would be zero. In this case the mortar has a "direct fly in" approach. The effect of gravity diminishes as the mortar closes on the target for short range shots using high quadrant elevation (>45 degrees) because the approach angle is closer to vertical. Thus the ballistic correction approach morphs into a direct fly in approach.

When a maneuver command is applied, the mortar develops an angle of attack (AOA). This AOA shifts the look angle to the target. As an example, for a 0.2 g maneuver a 6-DOF model shows that the AOA will be about 1.9 degrees. Thus, if the projectile is initially aimed 1 degree to the right of the target in the horizontal direction and a 0.2 g left maneuver is commanded, the target look angle will be 0.9 degrees to the right. As the mortar velocity vector turns left towards the target, the look angle will move further to the right. This does not indicate an over shoot. In fact the turn must be continued until the look angle is 1.9 degrees to the right. At this point the canards are zeroed and the AOA trims back to zero. With zero AOA and the velocity vector pointing to the target, the look angle will be zero. It is important to account for this AOA effect when steering because the expected AOA will be of comparable magnitude to the aim angle error.

Figure 11:
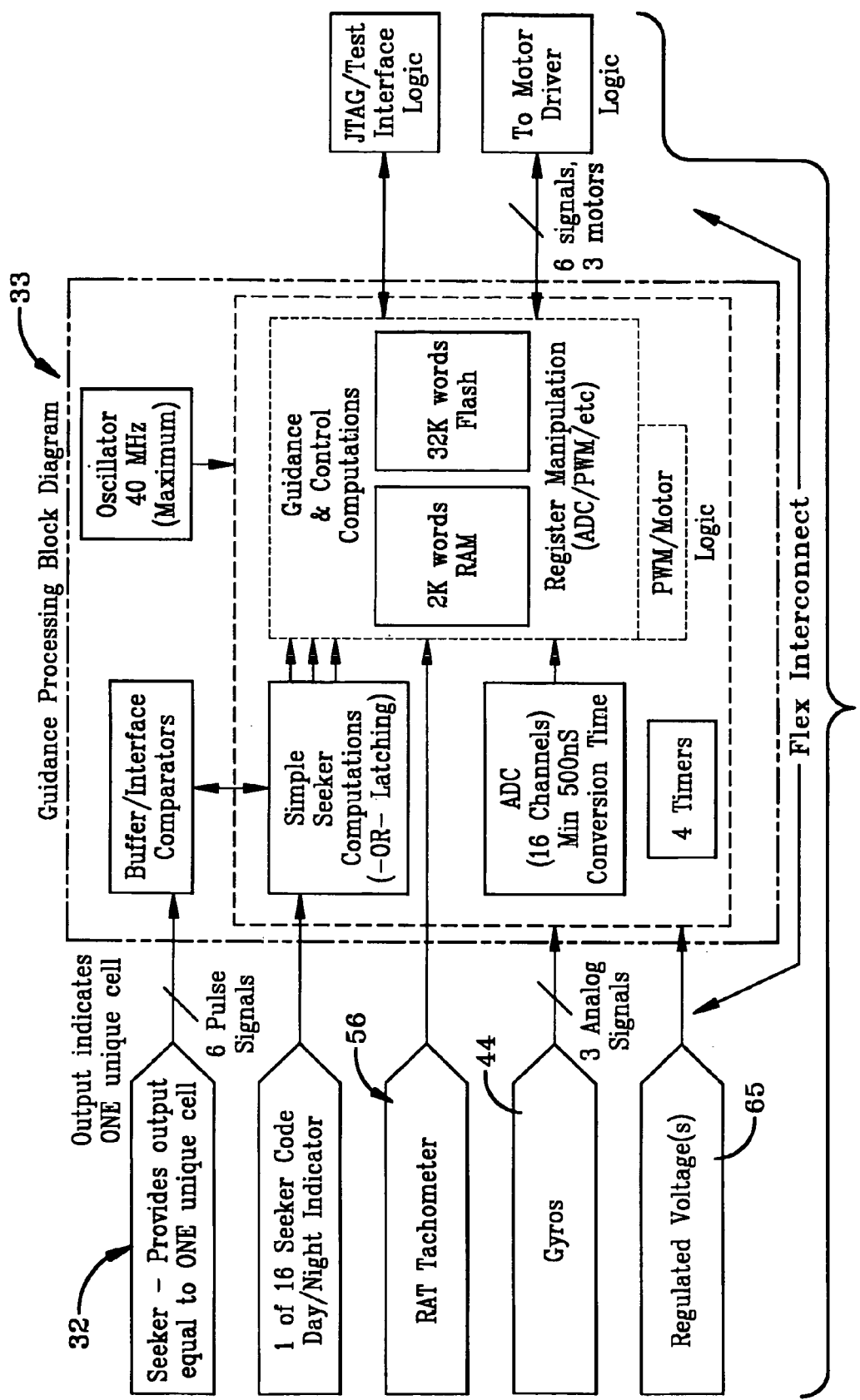
FIG. 11 is a schematic diagram showing a guidance and control functional processing block diagram for a preferred embodiment of the present invention.

The detection and target tracking functionality are integrated within the overall guidance and control system shown in FIGS. 4, 5 and 11. It is anticipated that the functionality of the guidance and control system 30 can be implemented on double sided rigid-flex printed circuit boards similar to those already implemented for existing M734A1 fuses. The individual circuit boards are compatible with the inner diameter of the fuse with components mounted normal to the direction of launch acceleration to further improve tolerance to launch shock loads as shown in FIG. 3. This approach has been demonstrated successfully in environments of over 25 kg's in large caliber munitions such as the 105 and 155 mm guided howitzer shells.

Gyros 44, preferably utilize MEMS technology and sense body rate, (yaw, pitch, and roll). These gyros are mounted in an orthogonal array in the mid-body section of the fuse. These gyros as commercially available, such as from Analog Devices, Inc., and have been demonstrated to over 2 kg's acceleration loads and are able to sustain launch at the 4.5 kg's level without modification. Other components can be obtained from demonstrated high G shock technologies in order to meet the required setback levels. Thus no new component technology is required to develop, host, integrate, test, and field the detection processing and target tracking algorithm of the present invention, thereby reducing the cost of fuse 10.

Those skilled in the art will appreciate that the method, apparatus and system of the present invention provides highly efficient means compatible with existing processor technology. Furthermore, the method, system and apparatus of the present invention also supports a variety of seeker output designs and interfaces and are compatible with multiple coded input signals. Furthermore, the system and method of the present invention utilizes many commercially available components in a unique way for performing the roll stabilization and flight control to the target resulting in an externally low cost system.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

The invention claimed is:

1. A system contained in a munition for optically guiding and controlling the munition toward a target, said system comprising:
   an optical seeker subsystem for detecting an illuminated target;
   a processor subsystem including a selector device for setting an authentication code in the munition requiring a match against a code transmitted by the illuminated target to arm the munition; a roll sensor for sensing the roll of the munition, and for developing steering commands based upon signals received from the roll sensor and from the optical seeker subsystem; and
   a flight control subsystem for operating a plurality of canards based upon the steering commands received from the processor subsystem for guiding the munition toward the illuminated target.

2. The guidance and control system defined in claim 1 wherein the processor subsystem includes at least three gyros for detecting the pitch, yaw and roll of the munition.

3. A method for optically guiding and controlling a munition flying in a ballistic path toward a target comprising the steps of:
   a) illuminating the target;
   b) detecting the illuminated target by an optical seeker mounted in the munition;
   c) establishing roll control of the munition;
   d) tracking the flight path of the munition toward the target by detection of the illuminated target by the optical seeker;
   e) providing steering commands to a plurality of flight control canards mounted on the munition based upon roll control and outputs from the optical seeker of the illuminated target for guiding the munition toward the illuminated target;
   f) detecting a code contained in radiation received from the illuminated target; and
   g) validating the detected code with respect to a code preset in the munition prior to launch.

4. The method defined in claim 3 including the step of arming the munition when the detected code is validated.

5. The method defined in claim 3 wherein the step of providing steering commands includes the steps of determining left/right centering error from the optical seeker and correcting any centering aiming error by moving certain canards.

6. A system contained in a munition for optically guiding and controlling the munition toward a target, said system comprising:
- an optical seeker subsystem for detecting an illuminated target;
- a processor subsystem including a roll sensor for sensing the roll of the munition, and for developing steering commands based upon signals received from the roll sensor and from the optical seeker subsystem;
- a flight control subsystem for operating a plurality of canards based upon the steering commands received from the processor subsystem for guiding the munition toward the illuminated target; and
- a Ram Air Turbine (RAT) in the munition for supplying the processor subsystem with time of flight signals and apogee determination signals.

7. A system contained in a munition for optically guiding and controlling the munition toward a target, said system comprising:
- an optical seeker subsystem for detecting an illuminated target;
- a processor subsystem including a roll sensor for sensing the roll of the munition and for developing steering commands based upon signals received from the roll sensor and from the optical seeker subsystem;
- at least three gyros for detecting the pitch, yaw and roll of the munition, and a Proportional-Integral-Derivative (PID) control circuit which derives inputs from the three gyros to deroll the munition; and
- a flight control subsystem for operating a plurality of canards based upon the steering commands received from the processor subsystem for guiding the munition toward the illuminated target.

8. The guidance and control system defined in claim 7 wherein the optical seeker subsystem includes an optic seeker and a detector array.

9. The guidance and control system defined in claim 8 wherein the detector array includes a plurality of photodetectors.

10. A system contained in a munition for optically guiding and controlling the munition toward a target, said system comprising:
- an optical seeker subsystem for detecting an illuminated target;
- a processor subsystem including a roll sensor for sensing the roll of the munition, and for developing steering commands based upon signals received from the roll sensor and from the optical seeker subsystem;
- a flight control subsystem for operating a plurality of canards based upon the steering commands received from the processor subsystem for guiding the munition toward the illuminated target; and
- a drive assembly for operating the canards including at least three shafts and four canards, one of said shafts being a common shaft for operating a pair of said canards and the other two shafts, each independently controlling another of said canards.

11. The guidance and control system defined in claim 10 wherein the drive assembly further includes a drive motor operationally connected to each of the three shafts through a gear assembly.

12. A method for optically guiding and controlling a munition flying in a ballistic path toward a target comprising the steps of:
a) illuminating the target;
b) detecting the illuminated target by an optical seeker mounted in the munition;
c) establishing roll control of the munition;
d) tracking the flight path of the munition toward the target by detection of the illuminated target by the optical seeker;
e) providing steering commands to a plurality of flight control canards mounted on the munition based upon roll control and outputs from the optical seeker of the illuminated target for guiding the munition toward the illuminated target;
f) determining the flight time of the munition to apogee;
g) estimating the trajectory of the munition based upon the flight time to apogee; and
h) determining the angle of attack (ACM) of the munition from the estimated trajectory.

13. A method for optically guiding and controlling a munition flying in a ballistic path toward a target comprising the steps of:
a) illuminating the target;
b) detecting the illuminated target by an optical seeker mounted in the munition;
c) establishing roll control of the munition;
d) tracking the flight path of the munition toward the target by detection of the illuminated target by the optical seeker;
e) establishing roll control of the munition including derolling the munition by providing a Proportional-Integral-Derivative control loop comprising providing a pitch rate gyro for obtaining the proportional input, a yaw rate gyro for obtaining the integral input, and a roll rate gyro for obtaining the derivative input; and
f) providing steering commands to a plurality of flight control canards mounted on the munition based upon roll control and outputs from the optical seeker of the illuminated target for guiding the munition toward the illuminated target.

14. A method for optically guiding and controlling a munition flying in a ballistic path toward a target comprising the steps of:
a) illuminating the target;
b) detecting the illuminated target by an optical seeker mounted in the munition;
c) establishing roll control of the munition;
d) tracking the flight path of the munition toward the target by detection of the illuminated target by the optical seeker; and
e) providing steering commands to a plurality of flight control canards mounted on the munition for guiding the munition toward the illuminated target based upon roll control and outputs from the optical seeker of the illuminated target including the further steps of estimating the munitions trajectory, matching the estimated trajectory against allowable trajectories stored in a processor in the munition to determine the true angle of attack (ACM), and providing up/down steering corrections to certain canards based upon a comparison of the true vertical AOA against the desired AOA for range error correction.

15. The method defined in claim 14 including the steps of determining the remaining time of flight of the munition to the target; and combining said time with the estimated trajectory of the munition to determine the true vertical AOA.

16. A method for optically guiding and controlling a munition flying in a ballistic path toward a target comprising the steps of:
   a) illuminating the target;
   b) detecting the illuminated target by an optical seeker mounted in the munition, said optical seeker including seeker optics and a detector array;
   c) establishing roll control of the munition;
   d) tracking the flight path of the munition toward the target by detection of the illuminated target by the optical seeker;
   e) centering the detector array on an optical axis of said array;
   f) canting the optical seeker downwardly with respect to the longitudinal axis of the munition; and
   g) providing steering commands to a plurality of flight control canards mounted on the munition based upon roll control and outputs from the optical seeker of the illuminated target for guiding the munition toward the illuminated target.

17. The method defined in claim 16 wherein the optical seeker is canted downwardly at an angle of approximately 6° relative to the axis of the munition.

* * * * *